(12) United States Patent
Knubben et al.

(10) Patent No.: US 7,120,245 B2
(45) Date of Patent: Oct. 10, 2006

(54) COMMUNICATION DEVICE HAVING A TWO-MODE CONTROLLED ISOLATION CIRCUIT FOR POWER TRANSPORT AND BIDIRECTIONAL COMMUNICATION

(75) Inventors: Wilhelmus Hubertus Chretien Knubben, Eindhoven (NL); John Johannes Soree, Eindhoven (NL); Petrus Adrianus Maria Van De Sande, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 229 days.

(21) Appl. No.: 10/480,674

(22) PCT Filed: Jun. 20, 2002

(86) PCT No.: PCT/IB02/02381
§ 371 (c)(1),
(2), (4) Date: Dec. 12, 2003

(87) PCT Pub. No.: WO03/003680
PCT Pub. Date: Jan. 9, 2003

(65) Prior Publication Data
US 2004/0196113 A1    Oct. 7, 2004

(30) Foreign Application Priority Data
Jun. 27, 2001    (EP) .................................. 01202466

(51) Int. Cl.
*H04M 1/00*    (2006.01)
*H04M 9/00*    (2006.01)

(52) U.S. Cl. .......................... 379/399.01; 379/413.02; 379/413.04

(58) Field of Classification Search ............................... 379/399.01–413.04
See application file for complete search history.

(56) References Cited

U.S. PATENT DOCUMENTS

2002/0126806 A1*    9/2002    Rahamim et al. ......... 379/93.05
2005/0036604 A1*    2/2005    Scott et al. ................. 379/413

\* cited by examiner

*Primary Examiner*—Fan Tsang
*Assistant Examiner*—Ramnandan Singh
(74) *Attorney, Agent, or Firm*—Peter Zawilski

(57) ABSTRACT

A communication device (1) is described, comprising a powered transceiver (2), a line transceiver (3), an isolation circuit (4) comprising three capacitors $C_{b1}$, $C_{b2}$ and $C_{b3}$, which are coupled between the powered transceiver (2) and the line transceiver (3), and a control circuit (5) arranged for controlling the transport of power from the powered transceiver (2) to the line transceiver (3) and for accomplishing a bi-directional communication across the isolation circuit (4). The control circuit is a two-mode controlled circuit (5), arranged such that during a first mode said power is transported and a communication in one direction is performed, and that during the second mode the communication in the other direction is accomplished. Such a device (1) and circuit (4) is small, has low capacitor values, and can be used at high switching frequencies up to several hundred MHz in telephony, medical instruments, industrial processes, modems, control and/or measuring apparatus, telecommunication apparatus and the like.

13 Claims, 3 Drawing Sheets

# COMMUNICATION DEVICE HAVING A TWO-MODE CONTROLLED ISOLATION CIRCUIT FOR POWER TRANSPORT AND BIDIRECTIONAL COMMUNICATION

The present invention relates to a communication device, comprising a powered transceiver, a line transceiver, an isolation circuit comprising at least two capacitors, which are coupled between the powered transceiver and the line transceiver, and a control circuit arranged for controlling the transport of power from the powered transceiver to the line transceiver and for accomplishing a bidirectional communication across the isolation circuit.

Such a communication device is known from WO 98/48541. The known communication device concerns circuitry for digital bidirectional communication across an isolation barrier comprising one or more in particular two capacitors. At either side of the capacitors there are transmitter/receivers -hereafter called transceivers- including encode and decode circuitry. On one side of the capacitors a powered digital circuit is present, which is to be electrically isolated from a non-powered line circuit, like a phone line circuit at the other side of the capacitors. The phone line circuit receives electrical power from the powered digital circuit and also bidirectional communication has to be accomplished across the capacitive isolation barrier. A capacitive galvanically isolating barrier having two capacitors is specifically described, wherein digital data in both directions is communicated across the same two capacitors, while energy is transferred over the very same two capacitors for creating power at the non-powered line circuit.

Although cost effective in the sense of requiring a minimum number of two barrier capacitors, all signals, timing, control hardware and software has to be focused on the requirements and limitations imposed by the narrow two capacitor throughput. In addition the reliable of the transmission of energy and the communication of signals across the barrier heavily depends on the two capacitors. In practise it is noted that the prior art communication device is vulnerable to failures, and that a trouble free operation especially on the long term cannot be guaranteed. In addition any failure of the known device will lead to for example the phone line to be completely silent, so that a locating of failures in the phone line connection as a whole has to be established.

It is an object of the present invention to provide an alternative more reliable communication device, which is still sufficiently cost effective and which provides more flexibility with respect to design and construction of various products that may be coupled to some communication line, or network to be provided with electrical power.

Thereto the communication device according to the invention is characterised in that the isolation circuit comprises three capacitors, and that the control circuit is a two-mode controlled circuit, arranged such that during a first mode said power is transported and a communication in one direction is performed, and that during the second mode the communication in the other direction is accomplished.

It is an advantage of the communication device according to the invention that power transport and communication in one direction during a first mode, and communication in the other direction during a second mode are effectively combined, while dispersed over three isolation circuit capacitors. This form of operation of the communication device according to the invention has appeared to be less vulnerable to failures. Furthermore the two mode operation of the communication device according to the invention provides a better control over the power transport and communication process through the three capacitor isolation circuit. Therefore reliability of the communication by means of said device has improved. In addition the communication device according to the invention makes it possible to perform some form of watch over a proper functioning of the device, because if one out of the three capacitors breaks down, the other two maintain operative, which may provide a failure indication that the device shows a failure. This way a defect in the phone line connection can be excluded. A further additional advantage is that if one of the capacitors is only used for communication purposes, this capacitor can have a lower capacitor value than the other two. This leads to a smaller size, and a more cost effective one capacitor.

An embodiment of the communication circuit according to the invention is characterised in that the first mode is a mode, wherein the powered transceiver is controlled to transmit and the line transceiver is controlled to receive.

Advantageously if for example a bi-directional data path is used between the two transceivers on either side of the three capacitor isolation barrier then the latter side can be supplied by a full-wave rectified clock signal coming from the powered transceiver. During the first or receive mode the line transceiver to be powered will enable data transfer across the barrier. This gives an elegant solution for supply of Tip and Ring interface circuits during an on-hook situation, which circuits are well known in a telephone line environment.

A further embodiment of the communication device according to the invention is characterised in that during the first mode all three capacitors in the isolation circuit are used for the power transport and the communication in one direction.

This embodiment provides during the first mode, a form of failure safe partial separation of power transport at the one hand and a communication in one direction at the other hand.

A more specifically outlined embodiment of the communication device for control during the first mode is characterised in that during the first mode the power transport is accomplished across a first combination of two out of the three capacitors and the communication in said one direction is accomplished across a second combination which differs at least partly from the first combination.

An easy to operate and to implement embodiment of the communication device according to the invention is characterised in that the communication device comprises switching means coupled to the isolation circuit, and that the switching means are provided with switching control inputs coupled to the two-mode controlled circuit.

If for example the switching means are controllable two and three way switches, the control by the control means takes place such that the first mode includes two switching positions/cycles of the switching means. Then the two switching cycles accomplish energy transport across the isolation barrier and during these two cycles a simultaneous uni-directional or bi-directional communication across the barrier is possible as well.

The bi-directional communication may be analog communication, digital communication or at wish a combination thereof. In the digital case the powered transceivers and the line transceivers are digital transceivers arranged for accomplishing pulse width modulated communication or more general some form of pulse density modulation.

Preferably the communication device according to the invention is characterised in that the line transceiver is used in telephony, medical instruments, modems, industrial processes, control and/or measuring apparatus, telecommunication apparatus and the like. Said communication device can also be used for interconnection of electronic devices, such as integrated circuits on a printed circuit board, whereby the electronic devices exchange information.

At present the communication device according to the present invention will be elucidated further together with its additional advantages while reference is being made to the appended drawing, wherein similar components are being referred to by means of the same reference numerals. In the drawing.

Figure 1:
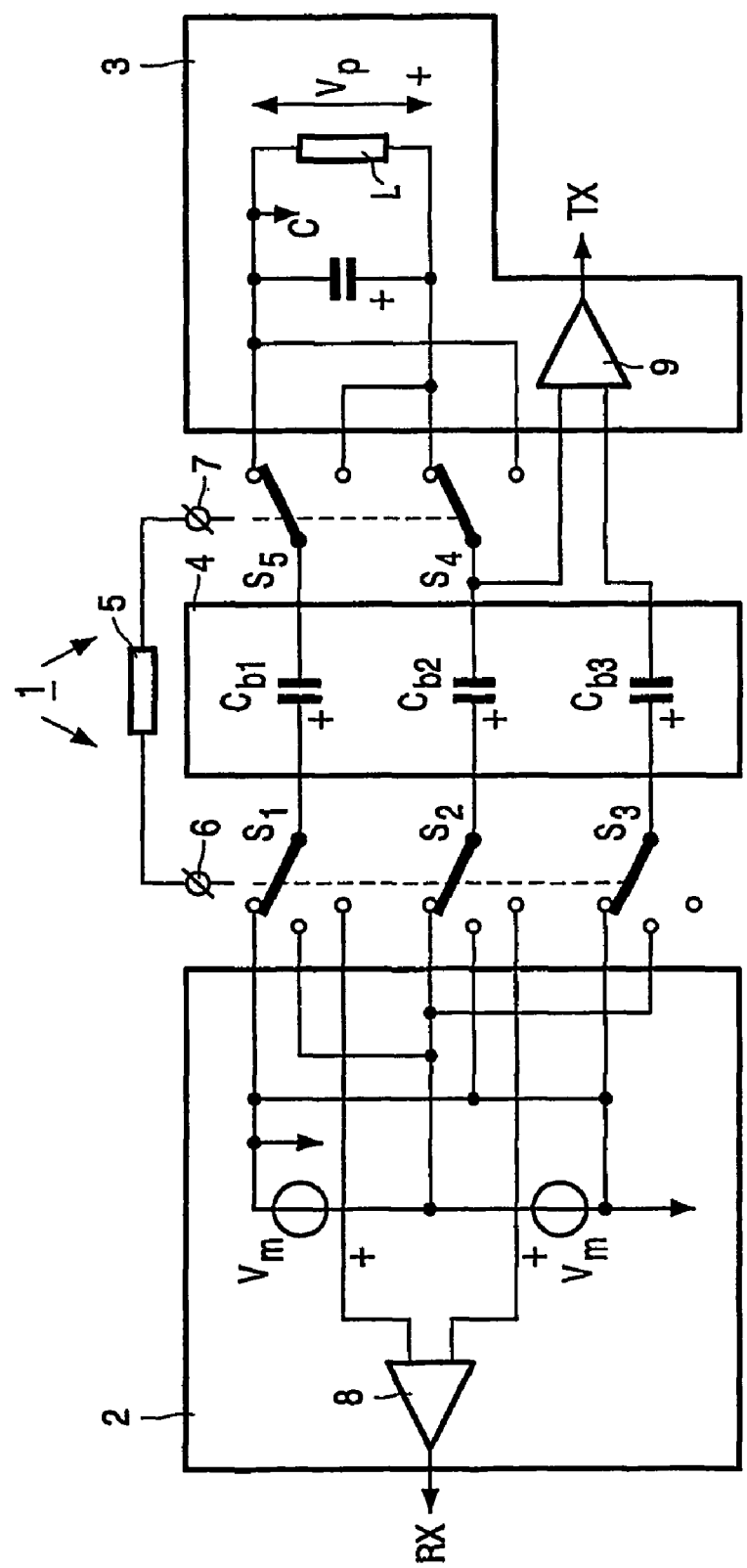
FIG. 1 shows a possible embodiment of the communication device according to the invention in a first switching cycle during a first mode.
Figure 2:
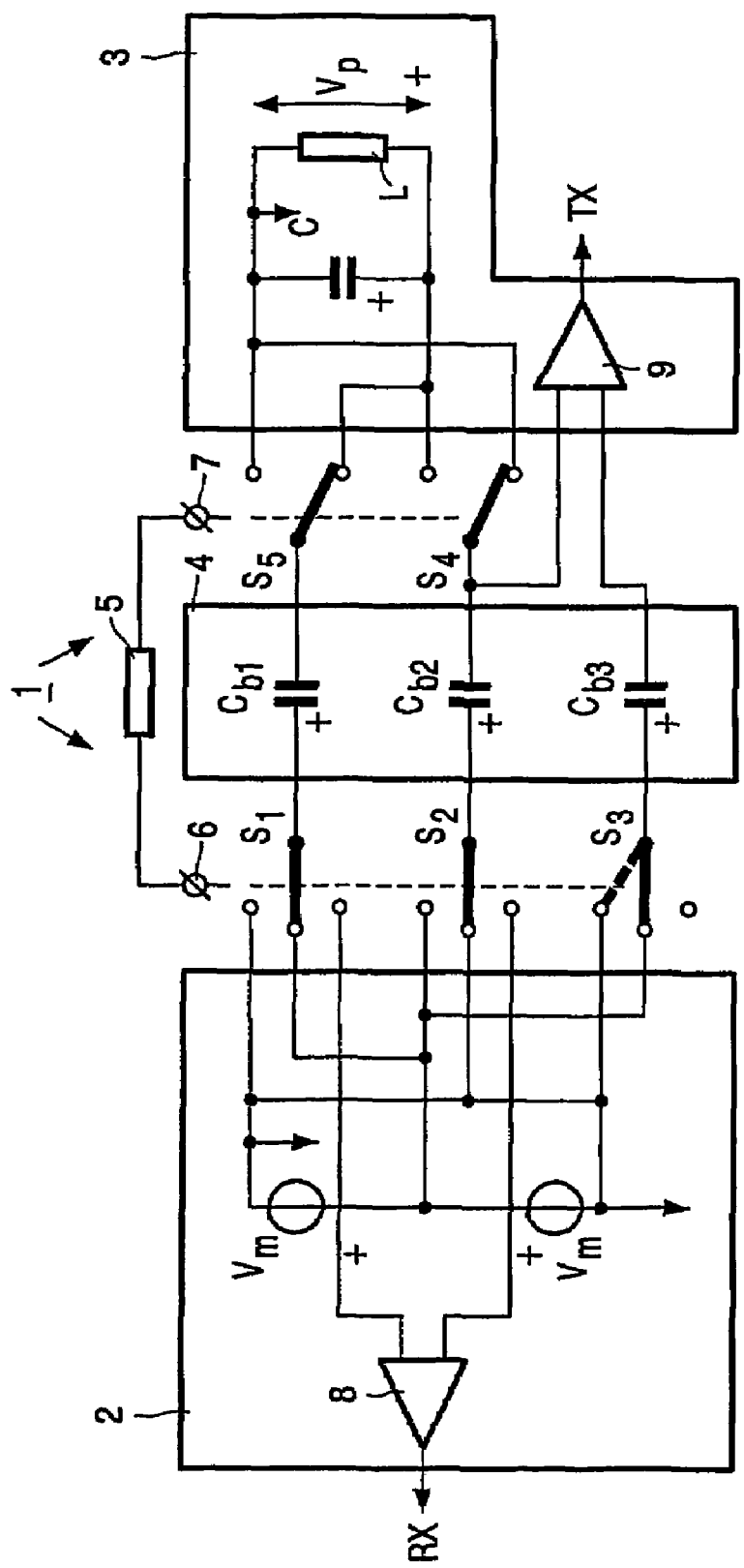
FIG. 2 shows the device of FIG. 1 in a second switching cycle during the first mode.
Figure 3:
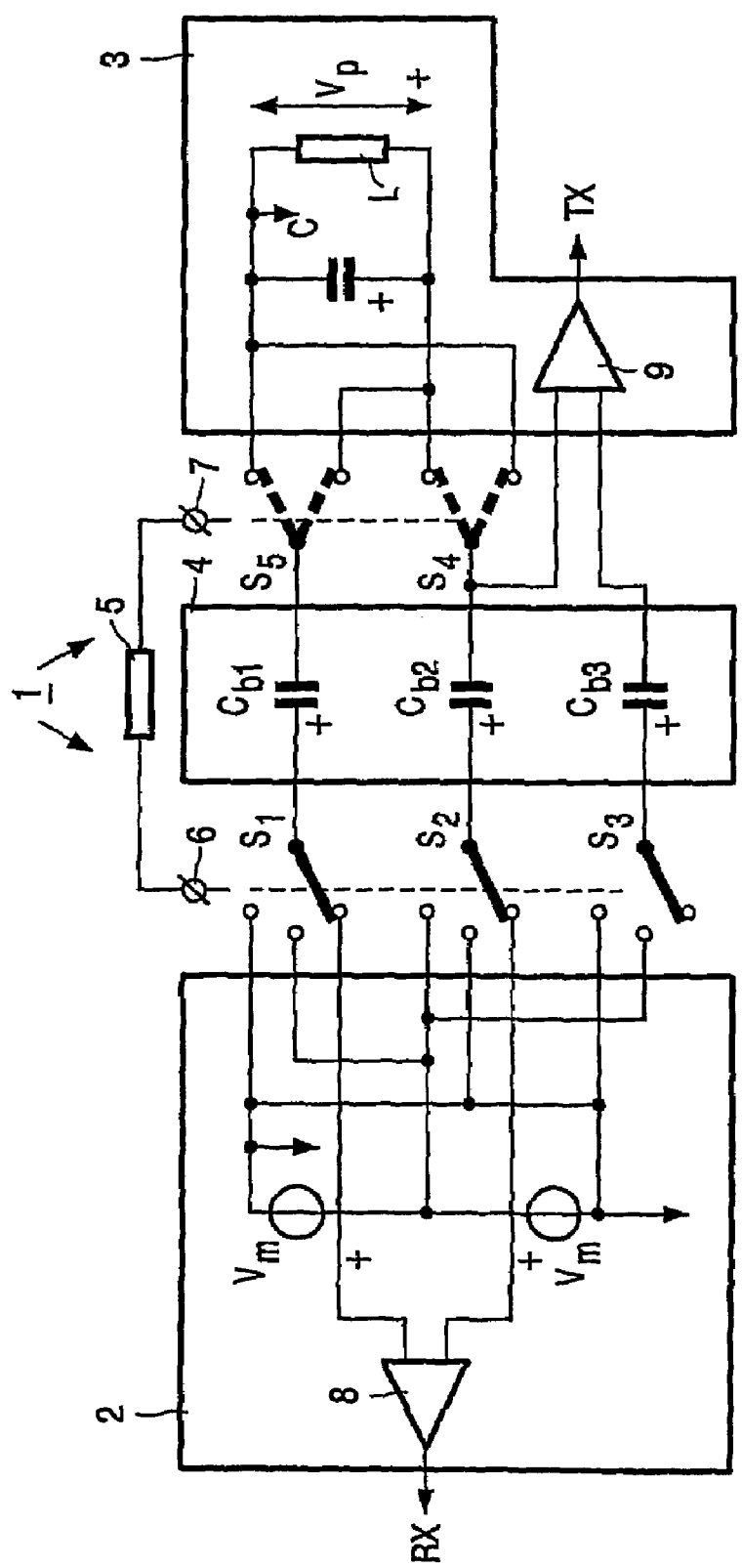
FIG. 3 shows the device of FIG. 1 in a third switching cycle during the second mode.

FIGS. 1–3 show a relevant part of a communication device 1. The communication device 1 comprises a transceiver 2, which is a transmitter/receiver of a kind which is provided with power, that is a supply voltage by some voltage source $V_m$, such as derived from a 220 Volt power supply (not shown). The device 1 comprises a line transceiver 3, such as a telephone line or network line transceiver, which is to be provided with a supply voltage coming from the powered transceiver 2. With respect to for example a telephone network, such as the Public Switched Telephone Network (PSTN) specific requirements exist regarding inter alia the galvanic isolation of the transceivers 2 and 3. These transceivers are galvanically isolated by means of an isolation circuit 4 comprising capacitors $C_{b1}$, $C_{b2}$ and $C_{b3}$ in the case to be described hereafter three capacitors. These capacitors $C_{b1}$, $C_{b2}$ and $C_{b3}$ are coupled between the powered transceiver 2 and the line transceiver 3. In addition the communication circuit 1 comprises a control circuit (Contr.) 5, which is arranged for controlling the transport of power from the powered transceiver 2 to the line transceiver 3. The control circuit 5 also accomplishes a bidirectional communication across the capacitors $C_{b1}$, $C_{b2}$ and $C_{b3}$, which communication will generally encompass the transmission of digital signals across the isolation circuit 5. Thereto the control circuit 5 is a two-mode control circuit, whereby during a first mode the power is transported and a communication in one direction is performed, and whereby during the second mode the communication in the other direction is accomplished.

The powered transceiver 2, as well as the line transceiver 3 comprises encoders and/or decoders (not shown) for allowing analog, but nowadays in particular mutual digital communication there between. Hereafter the principles of the presented communication device 1 will be elucidated, and this is done by illustrating switching means $S_1 \ldots S_5$. In practise these switching means will be implemented by means of semiconductor switches, such as Field Effect Transistors (FETs). The functioning of the two-mode controlled circuit 5 and in particular the control of the switches $S_1 \ldots S_5$ through switching control inputs 6 and 7 thereof, by means of the control circuit 5 coupled to these inputs 6 and 7, will now be explained. The first control mode of the circuit 5 encompasses two switching cycles, shown in FIGS. 1 and 2 respectively, and the second control mode encompasses the third switching cycle, shown in FIG. 3.

In FIGS. 1–3 the switches $S_1 \ldots S_3$ have three states or cycles and switches $S_4$ and $S_5$ have two states or cycles. The common contacts of the switches $S_1 \ldots S_5$ are coupled to the respective capacitors $C_{b1}$, $C_{b2}$ and $C_{b3}$, as shown and respective contacts of the switches $S_1 \ldots S_5$ are coupled as shown in the FIGS. 1–3, which will be explained hereafter. In the first switching cycle capacitor C and load L at the transceiver 3 receive a supply voltage $V_p$ derived from the upper voltage source $V_m$. $C_{b1}$ then assumes a voltage equal to: $-(V_m-V_p)/2$. $C_{b2}$ is charged to a voltage equal to: $+(V_m-V_p)/2$, and $C_{b3}$ is charged to: $-(V_m-V_p)/2$. In the embodiment of the communication device 1 as shown powered transceiver 2 has a receiver 8 coupled to the lower contacts of switches $S_1$ and $S_2$, and line transceiver 3 has a receiver 9 here coupled directly to the capacitors $C_{b2}$ and $C_{b3}$. So in cycle 1 of FIG. 1 receiver output signal RX will be undefined, at least in this switching scheme, and receiver output signal TX will be 'high', or can at wish be used for providing a modulation or data signal used in transceiver 2 to modulate the lower power source $V_m$. It is noted here that in a possible variant the upper input of the receiver 9, which is now shown to be coupled to the connection of capacitor $C_{b3}$ and switch $S_4$ may be deleted and internally coupled to earth, or may instead be coupled to either sides of the supply voltage $V_p$.

In the second switching cycle of FIG. 2 capacitor C and load L at the transceiver 3 receive a similar voltage $V_p$ now derived from the lower voltage source $V_m$. Now the polarity of the voltages on capacitors $C_{b1}$, $C_{b2}$ and $C_{b3}$ is reversed and also the switches $S_4$ and $S_5$, which form a rectifying bridge, is reversed. Capacitors $C_{b2}$ and $C_{b3}$ are then in the variant as shown connected in parallel and $C_{b3}$ is charged to $+(V_m-V_p)/2$, but does not contribute to the charge transport from powered transceiver 2 to line transceiver 3. The TX output signal is now 'Low', or could receive any data modulation signal on either the upper or the lower power source $V_m$. The output signal RX is still undefined. So far the first control mode of the control circuit 5, wherein all three capacitors are being used for power transport and communication in one direction, that is in general either from transceiver 2 to transceiver 3 or vice versa.

The second mode is shown in the third switching cycle of FIG. 3. Herein a receive signal can be sent from line transceiver 2 to powered transceiver 3 via capacitors $C_{b1}$ and $C_{b2}$, and output signals TX and RX are either 'High' or 'Low' depending on the positions of the switches $S_4$ and $S_5$.

In general the powered transceiver 2 and the line transceiver 3 are digital transceivers arranged for accomplishing generally pulse width modulated communication, which is one possible form of pulse density modulation. The communication device 1 can for example be used in telephony, medical instruments, industrial processes, modems, control and/or measuring apparatus, or other telecommunication apparatus. Switching frequencies up to several hundred MHz are possible, depending on the magnitude of the supply voltage, which results in isolating capacitor values which are relatively low, thus resulting in relatively small capacitors, that are relatively inexpensive and easy to get.

Whilst the above has been described with reference to essentially preferred embodiments and best possible modes it will be understood that these embodiments are by no means to be construed as limiting examples of the devices concerned, because various modifications, features and combination of features falling within the scope of the appended claims are now within reach of the skilled person.

The invention claimed is:

1. A communication device comprising:
   a powered transceiver;
   a line transceiver;
   an isolation circuit comprising at least three capacitors, at least two of which are coupled between the powered transceiver and the line transceiver; and a control circuit arranged for controlling the transport of power from the powered transceiver to the line transceiver and for accomplishing a bi-directional communication across the isolation circuit, wherein the capacitors and the control circuit are to provide a two-mode controlled communication such that during a first mode said power is transported and a communication in only one direction is performed, and that during the second mode the communication in only the other direction is accomplished.

2. The communication device according to claim 1, wherein the first mode is a mode, wherein the powered transceiver is controlled to transmit and the line transceiver is controlled to receive.

3. The communication device according to claim 1, wherein during the first mode all three capacitors in the isolation circuit are used for the power transport and the communication in one direction.

4. The communication device according to claim 3, wherein during the first mode said power transport is accomplished across a first combination of two out of the three capacitors and the communication in said one direction is accomplished across a second combination of at least one capacitor which differs at least partly from the first combination.

5. The communication device according to claim 1, wherein the communication device comprises switching means coupled to the isolation circuit, and that the switching means are provided with switching control inputs coupled to the two-mode control circuit.

6. The communication device according to claim 5, wherein the switching means are controllable two and three way switches.

7. The communication device according to claim 5 wherein the first mode includes two switching positions/cycles of the switching means.

8. The communication device according to claim 1 wherein the bi-directional communication is digital communication.

9. The communication device according to claim 8, wherein the powered transceivers and the line transceivers are digital transceivers arranged for accomplishing pulse width modulated communication.

10. The communication device according to claim 1 wherein the line transceiver is used in telephony, medical instruments, industrial processes, modems, control and/or measuring apparatus, telecommunication apparatus and the like.

11. A powered transceiver for application in a communication device having the powered transceiver, a line transceiver, an isolation circuit comprising at least three capacitors, at least two of which are coupled between the powered transceiver and the line transceiver, and a control circuit arranged for controlling the transport of power from the powered transceiver to the line transceiver and for accomplishing a hi-directional communication across the isolation circuit, characterised in that the capacitors and the control circuit are to provide a two-mode controlled communication such that during a first mode said power is transported and a communication in only one direction is performed, and that during the second mode the communication in only the other direction is accomplished.

12. A line transceiver for application in communication device having
- a powered transceiver,
- the line transceiver,
- an isolation circuit comprising at least three capacitors, at least two of which are coupled between the powered transceiver and the line transceiver,
- and a control circuit arranged for controlling the transport of power from the powered transceiver to the line transceiver and for accomplishing a bi-directional communication across the isolation circuit,
- wherein capacitors and the control circuit are to provide a two-mode controlled communication such that during a first mode said power is transported and a communication in only one direction is performed, and that during the second mode the communication in only the other direction is accomplished.

13. An isolation circuit for application in a communication device comprising,
- a powered transceiver,
- a line transceiver,
- an isolation circuit comprising at least three capacitors, at least two of which are coupled between the powered transceiver and the line transceiver, and
- a control circuit arranged for controlling the transport of power from the powered transceiver to the line transceiver and for accomplishing a bi-directional communication across the isolation circuit, wherein the capacitors and the control circuit are to provide a two-mode controlled communication such that during a first mode said power is transported and a communication in only one direction is performed, and that during the second mode the communication in only the other direction is accomplished.

* * * * *